(12) United States Patent
Horton et al.

(10) Patent No.: US 10,552,123 B2
(45) Date of Patent: Feb. 4, 2020

(54) IN-LINE CODE ADORNMENTS

(71) Applicant: Microsoft Technology Licensing, LLC, Redmond, WA (US)

(72) Inventors: Anson Michael Horton, Kirkland, WA (US); David Ellis Pugh, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 23 days.

(21) Appl. No.: 15/919,192

(22) Filed: Mar. 12, 2018

(65) Prior Publication Data
US 2019/0278569 A1    Sep. 12, 2019

(51) Int. Cl.
*G06F 8/33* (2018.01)
*G06F 8/34* (2018.01)
*G06F 8/41* (2018.01)

(52) U.S. Cl.
CPC .................. *G06F 8/33* (2013.01); *G06F 8/34* (2013.01); *G06F 8/41* (2013.01)

(58) Field of Classification Search
CPC .................. G06F 8/33; G06F 8/34; G06F 8/41
USPC .................................. 717/110–113, 140–161
See application file for complete search history.

(56) References Cited

U.S. PATENT DOCUMENTS

| 6,105,036 | A * | 8/2000 | Henckel | G06F 17/30607 |
| 8,806,430 | B1 * | 8/2014 | Bienkowski | G06F 8/34 717/110 |
| 9,274,756 | B1 * | 3/2016 | Clausen | G06F 8/33 |
| 2004/0003373 | A1 * | 1/2004 | Van De Vanter | G06F 17/212 717/112 |
| 2004/0003388 | A1 * | 1/2004 | Jacquemot | G06F 8/60 717/174 |
| 2005/0114771 | A1 * | 5/2005 | Piehler | G06F 17/21 715/264 |
| 2007/0011651 | A1 * | 1/2007 | Wagner | G06F 8/33 717/110 |
| 2007/0130519 | A1 * | 6/2007 | Tilford | G06F 17/211 715/236 |
| 2012/0131547 | A1 * | 5/2012 | Muir | G06F 8/20 717/109 |
| 2012/0233602 | A1 * | 9/2012 | Ramaswamy | G06F 9/45516 717/148 |
| 2013/0055223 | A1 * | 2/2013 | Xu | G06F 8/427 717/143 |
| 2013/0074036 | A1 * | 3/2013 | Brandt | G06F 8/73 717/113 |

(Continued)

*Primary Examiner* — Qing Chen

(57) ABSTRACT

Embodiments relate to incorporating supplemental information into a code editor's editing view that may make the code more understandable to those not familiar or comfortable with the code. The editor receives adornments that may be translations or semantic equivalents of constructs already in the code. The editor adds the adornments to an editing view for editing the source code. The adornments are inserted into lines of the source code displayed in the editing view and have some of the appearance of the source code in the editing view. The adornments are passive with respect to the source code; they are not necessarily compiled or saved. The adornments may be tokens provided by a compiler and/or an integrated development environment. The editor may apply heuristics or rules to determine which adornments are to be used and where they will be inserted.

18 Claims, 6 Drawing Sheets

(56) References Cited

U.S. PATENT DOCUMENTS

| | | | |
|---|---|---|---|
| 2014/0181786 A1* | 6/2014 | Alanis | G06F 11/3624 |
| | | | 717/106 |
| 2016/0350084 A1* | 12/2016 | Waggoner | G06F 8/34 |
| 2016/0378739 A1* | 12/2016 | Derbakova | G06F 17/24 |
| | | | 715/780 |
| 2017/0116109 A1* | 4/2017 | Perez Acosta | G06F 8/42 |
| 2017/0123762 A1* | 5/2017 | Drukman | G06F 8/31 |

* cited by examiner

IN-LINE CODE ADORNMENTS

BACKGROUND

Editors have long been used to edit source code for computer programming languages. A language is typically defined by a set of lexical, grammatic, and semantic rules. Code compliant with the language is compiled or interpreted according to the language's rules to produce a translated form which may in turn be code in another language or instruction set, for instance intermediate language code, executable object code, machine instructions, another programming language, and so forth. Editors are generally designed to receive a copy of source code from a source code file or other unit of organizing code, display the source code as editable text in an editing region managed by the editor, and save edits to the source code file. The editor is may be part of an integrated development environment (IDE), which may include compilers, project management features, and other known components.

Code editors generally present code for editing with a one-to-one relationship between the displayed code and the underlying representation stored in a buffer or file. That is, what the code editor displays is a faithful graphic representation of the state of the source code open for editing; the positions of characters, indentations, positions of lines, etc., mirror the content of the code's file or buffer, which is updated in correspondence with editing of the code. The approach of having editors display faithful graphic representations of the underlying code being edited is beneficial, but it has shortcomings.

Many languages have constructs that can make it difficult to understand source code. For example, implicitly typed declarations (e.g., "var"), untyped declarations, and other constructs that can be resolved at compile time, yet such resolution may not be obvious to the user viewing the source code in the typical code editor. There may be many reasons why a user is unfamiliar with the hidden information associated with source code the user is editing. Another user may have originally authored the source code. The user may have written or last reviewed the source code too long ago to recall the meanings of declarations and the like. The editing user may not know the datatypes or classes implicitly referenced in the source code. For instance, the source code being edited might be part of a complex project which may make remembering the meaning of constructs difficult.

In addition to implicit typing information that may be unfamiliar, there may be comments and other previously-authored text in a language not understood by the user. If one user speaks—and codes in—a language not understood by the user currently editing the code, then the code may difficult to read for the non-speaking user. Comments, variable names, etc., may be difficult for the user to understand and work with.

Not only might potentially helpful information be missing, but the editing user is often not accustomed to the formatting of the source code being edited. Required but unfamiliar conventions may make reading the source code difficult.

Two approaches have been used to provide additional information and easier reading to a person editing source code. One approach has been to have editors, perhaps using macros or built-in tools, alter the source code being edited in semantically neutral ways. With this approach, the text being edited is updated in both the editor's view and in the underlying representation (e.g., a buffer storing the code being edited). Whitespace, newline characters, arrangement of block delimiters, and other transforms have been used. While this approach can be helpful, the alteration of the source code has obvious limitations. Furthermore, such alterations tend to be mechanical and may not tailor themselves to the individual user or usage context. Moreover, they can cause difficulties for source code control systems because they manipulate the buffer with spurious changes, making code reviews and history more complex to review.

Another approach has been to make use of user interface enhancements to provide more information to a use. For instance, so-called tooltips have been used to reveal information about source code elements when a user positions a pointer to hover over them. Information panels in IDEs can also provide information about a code construct responsive to selection of the code. However, as only the inventors have observed, this approach provides supplemental information in a way that is inefficient. Because the information is not integrated into the text of the source code being edited, the user may not be able to readily relate the information to the source code displayed in the editor. In addition, the hover-over method can only show information about one target code construct at a time.

Techniques related to in-line code adornment are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments relate to incorporating supplemental information into a code editor's editing view. The editor receives adornments that are related to source code being edited in the editor. The editor selects some of the adornments to add to an editing view for editing the source code. The selected adornments are inserted into lines of the source code displayed in the editing view and have some of the appearance of the source code in the editing view. The editor maintains two sets of information: the source code, and whichever adornments are selected and inserted into the editing view. The adornments are passive with respect to the source code; they manifest in the editing view but are not necessarily compiled or saved. The adornments may be tokens provided by a compiler and/or an integrated development environment. The editor may apply heuristics or rules to determine which adornments are to be used and where they will be inserted.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
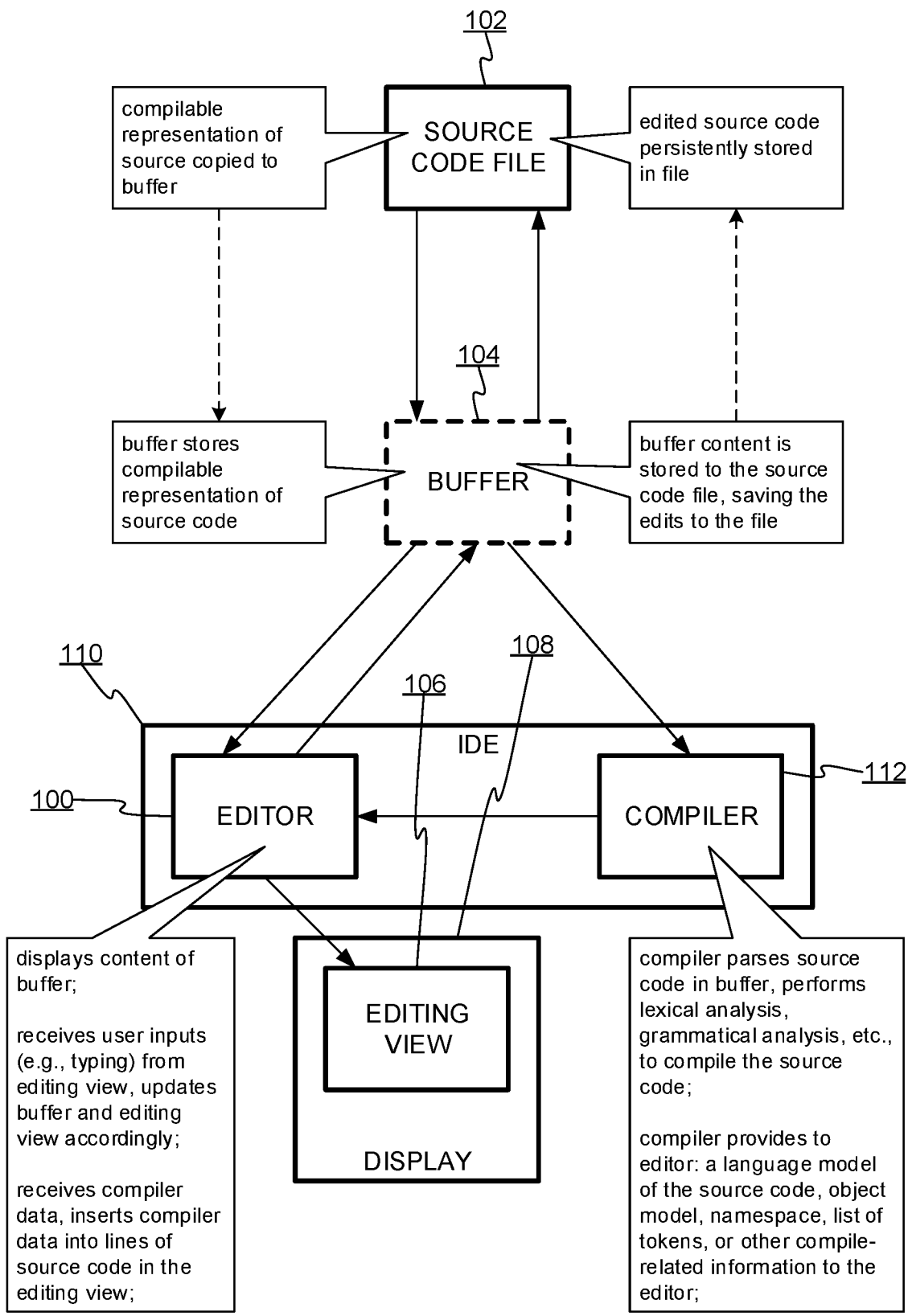
FIG. 1 shows data flow related to an editor editing source code from a source code file.

FIG. 1 shows data flow related to an editor 100 editing source code from a source code file 102. The source code file 102 may be in any known form such as a text file managed by a filesystem of an operating system hosting the editor 100. Alternatively, code can be persistently stored in a structured form such as in a database (e.g., Smalltalk) where the code that is generated has no corresponding existence in its persisted form. The source code file 102 contains source code conforming to a computer language such as a programming language, a markup language, etc. The source code file 102 persistently stores the compilable representation of the source code. When the source code file 102 is to be edited by the editor 100, the content of the source code file is copied to a memory buffer 104. The buffer 104 stores the compilable source code and is the backing of the source code displayed by the editor in an editing view 106 displayed on a display 108 of the host. The editor maintains a one-to-one mapping between the source code in the buffer and the source code in the editing view 106. When a user edits the source code in the editing view 106 the contents of the buffer change accordingly. If the editor saves the edited source code the buffer is flushed to the source code file. If the editor re-loads the file, the buffer is emptied and re-filled with the contents of the file, and the editing view is refreshed with the new content of the buffer. A buffer is not required and, in some embodiments, may be omitted.

The editor may be part of an IDE 110 that includes a compiler 112. In some embodiments, the editor may interface with a language service that parses the code (e.g. a compiler or interpreter) and that uses the information from the parsed code to execute commands (e.g. format a line, go to a definition) or display artifacts to the user. The compiler 112 is configured for compiling the language of the source code being edited. The compiler 112 performs functions such as lexical and grammatical analysis, building an internal representation of the source code, generating object or executable code, etc. The IDE 110 may be configured to have the compiler perform background compilation of the source code in the buffer 104 while the source code is displayed for editing in the editing view 106. The compiler might compile when no user input is received for a given period of time. The compiler might compile responsive to each completed token or line of code. In one embodiment, the IDE/compiler maintain a continuing state of compilation to maintain a correspondence with the edited state of the source code. In such a case, the compiler may have a rich set of data about the source code. The IDE/compiler may maintain a model with data about the source code. The nature of the model will depend on the particular compiler implementation. Some compilers may build a namespace of the names of classes or datatypes in the source code. Others may build a tree reflecting the statements and grammatical structure of the source code. Some compilers build an object model. The term "model" as used here refers to any known type of data a compiler obtains about source code from the process of pre-compiling and/or compiling the source code. The compiler may as readily be an interpreter and the term "compiler" as used herein is deemed to also refer to interpreters, where technically appropriate.

By providing a compiler-derived model of the source code to the editor, the editor has at its disposal information that can be used to supplement the source code of the buffer 104 that is displayed in the editing region 106. The form and content of the model is not significant, so long as the editor is provided with access to information about its source code that is derived from the translation performed by the compiler 112.

Figure 2:
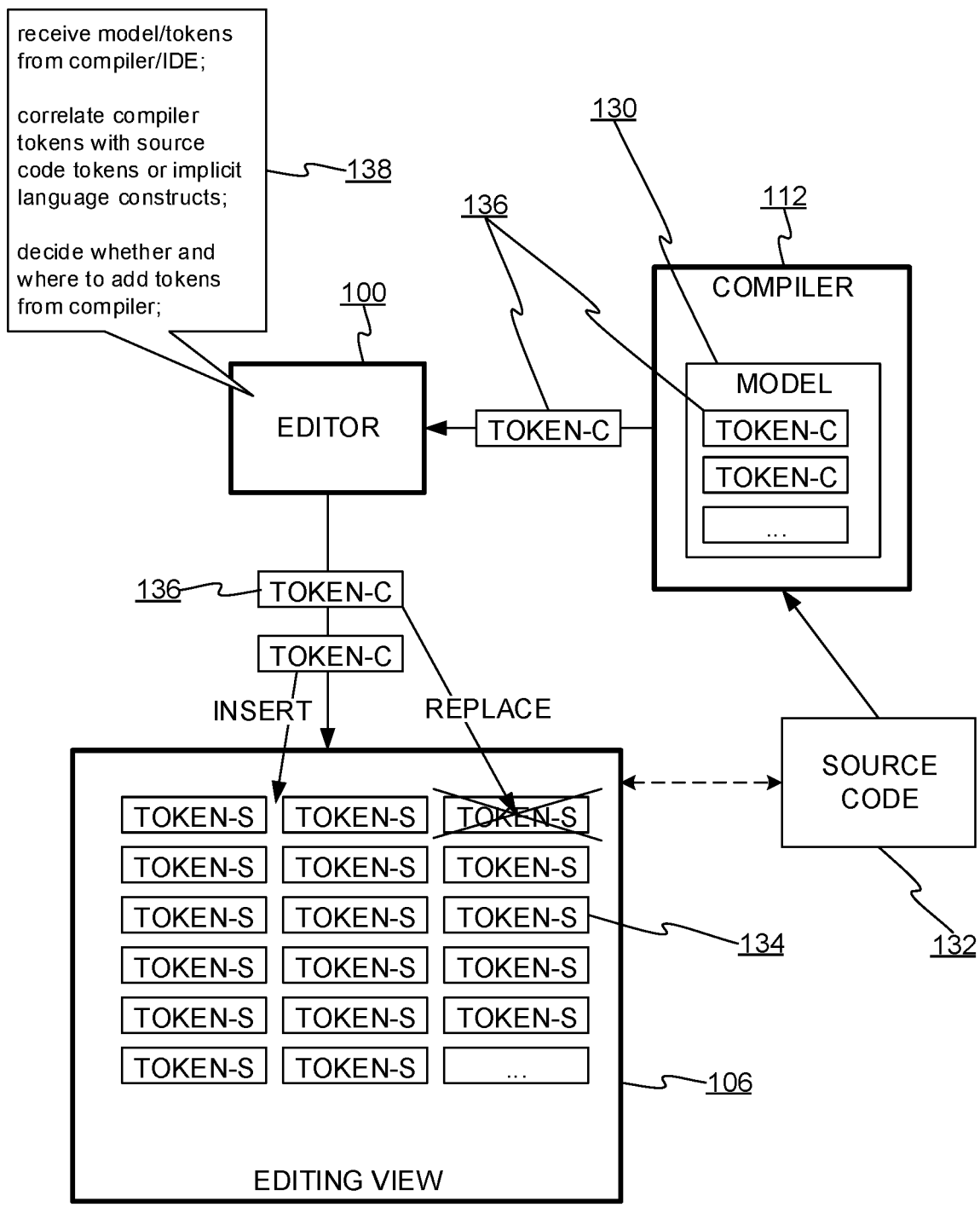
FIG. 2 shows how a compiler's code model can be used to supplement the source code displayed in an editing view.

FIG. 2 shows how a compiler's code model 130 can be used to supplement the source code 132 displayed in the editing view 106. The source code 132 is comprised of text conforming to the relevant language. When parsed and lexically analyzed by the compiler, the source code is broken down into tokens for language keywords, identifiers, punctuation/separators, operators, literals, etc. For convenience, editing view 106 shows source code text in the form of source tokens 134 ("token-s", for source) that correspond to the editable and compilable source code that is subject to editing in the editing view and the buffer managed by the editor. The text corresponding to the source tokens 134 is subjected to the editing logic of the editor and is also consumed by the compiler to produce the model 130. The model 130 includes compiler tokens 136 ("token-c", for compiler) derived by the compiler. A token is just one type of adornment that might be incorporated into an editor view. The term "token" here refers lexical, syntactic, and/or semantic outputs of the compiler and need not be in the same form as used internally by the compiler, although the text of the tokens may come directly from the compiler. In short, the term "token" refers to any supplemental information that the compiler can associate with constructs in the source code (e.g., source tokens 134) that is subjected to editing and compilation. To be clear, to the editor, the buffer is effectively a collection of characters (or lines and characters) and not tokens per se. The language service may tell the editor to, for example, replace characters [1022 . . . 1025] with "Class1" or—for a pure insertion—replace characters [1831 . . . 1831] with "this" (an example token).

The editor performs a process 138 to use the compile model 130. The editor receives the model 130 from the compiler/IDE. The editor may iterate over the compiler tokens 136 and evaluate each for potential adornment in the editing view 106. If the editor determines that a compiler token is associated with a construct in the source code 132, the editor may decide how and whether to incorporate the token in the editing view 106. The compiler token may be associated with an implicit construct (e.g., an implicit type declaration) and be inserted into the editing view 106. The compiler token may be associated with an explicit construct (e.g., a source token 134) and may replace the associated source construct. Both types of insertion are shown in the editing view 106. However, even though an insertion is in-line (within a line of code), the insertion is isolated from the compiler. Isolation may be achieved in several ways. In one embodiment, the editor keeps track of two sets of text in the editing view; the text that makes up the editable/compilable source code 132, and the adornment token text derived from the compiler model. In another embodiment, the editor may maintain two buffers (see FIG. 5), and the code shown in the editing view is a merger of the adornment text and the source code text. In any case, preferably, the added tokens or adornments are only operative in the editing view and the underlying buffer (which is typically savable to a persistent object such as a file) is not changed.

The inserted compiler tokens—or more generally text adornments—are shown in-line within the lines of the source code shown in the editing view 106. The editing view 106 is a linear set of characters. When an adornment is inserted, the text after the inserted adornment is shifted to accommodate the adornment. In one embodiment, an adornment is just an image and the non-adornment source code in the editing view is graphically moved to accommodate the adornment. Editable/selectable text is not added. If a source token is replaced, it remains logically present in the text of the editor/buffer but is not shown in the editing view. In another embodiment, adornments are inserted in-line as text fully or partially subject to text editing operations (e.g., selectable but not editable, editable, etc.), although the inserted text remains functionally separate and is omitted when the contents of the editing view/buffer are saved to the original source code file 102. To the user, the inserted adornment may have some of the graphic traits of the source code in the editing view 106. Specifically, the inserted adornments are part of a scrollable view or surface displaying the text being edited. The adornments scroll, scale, etc. with scrolling scaling of the view just as the non-adornment source code does. The adornments are presented within lines of source code in the view and appear where the language and the relevant source code dictate their presence. If an adornment disambiguates an ambiguous construct, the adornment is inserted in-line at the place of the ambiguous construct.

Figure 3:
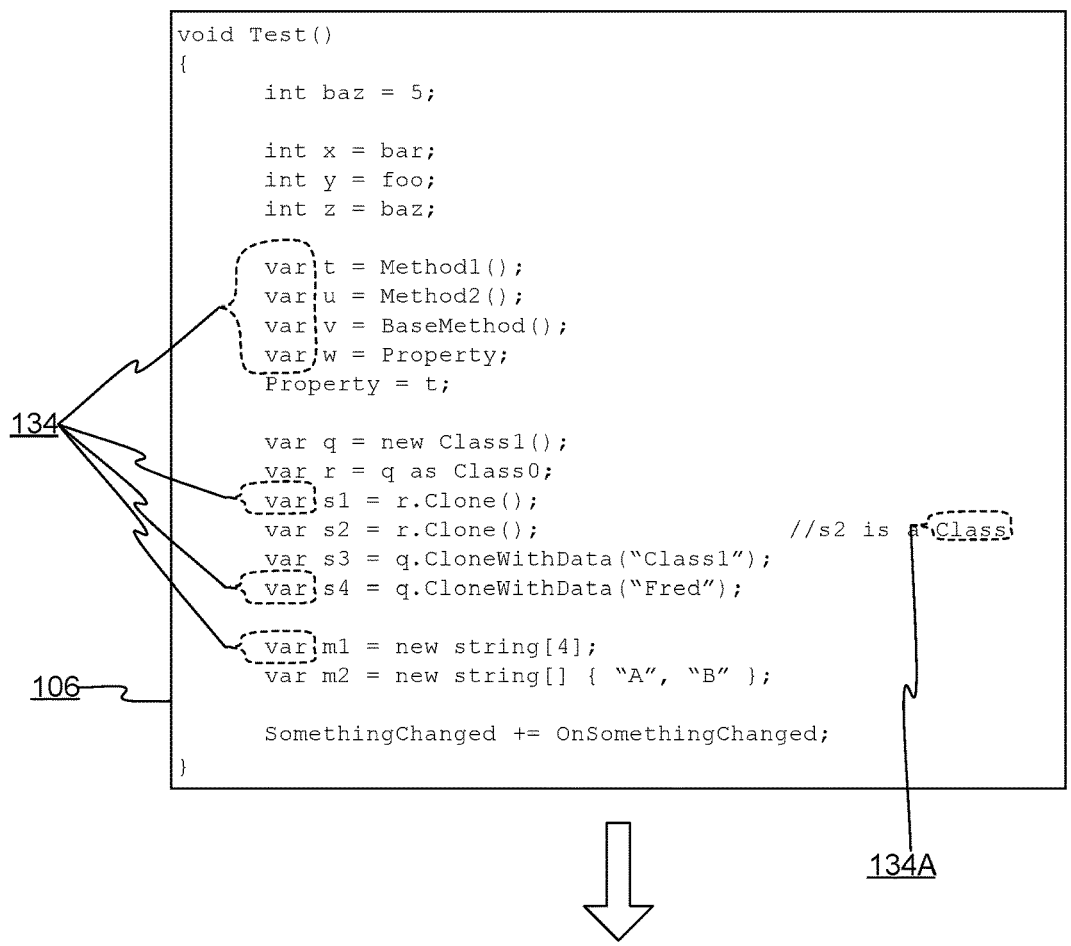
FIG. 3 shows examples of adornment augmentation in the editing view.

FIG. 3 shows examples of adornment augmentation in the editing view 106. The top half of FIG. 3 shows an editing view of source code prior to insertion of adornments. The view at the top half shows some source code tokens 134 that are identified by the editor as candidates for replacement with adornments. In this example, the "var" type declaration is ambiguous. The compiler informs the editor about the actual types of the variables declared as vars. Various source tokens 134 and implicit constructs (not shown) have been targeted by the editor (selection is discussed below). The lower half of FIG. 3 shows the editing view 106 after the editor has added adornments. In the example of FIG. 3, compiler tokens 136 (or the textual equivalent) have graphically replaced their semantic equivalents in the displayed lines of source code. The added adornments in FIG. 3 are shown with bold and italics to differentiate from the non-adornment source code. Color, size, or other attributes may be used to distinguish the adornments from the source code subject to compilation. Again, the graphic appearance of the code shown in the view differs from the logical editing state of the source code.

In the example of FIG. 3, not all of the elements typically identified by the compiler have been replaced. As discussed below, heuristics or preferences may control which elements are replaced in the editing view. The heuristics or preferences may determine, based on various conditions, that many of the tokens in the source code do not need to be supplemented or adorned.

Furthermore, as noted above, it is also possible that supplemental information can be supplied from other sources besides a compiler. For instance, the compiler might identify comments in the source code and provide the comments to a human-language translation component that identifies text that is in a non-preferred language and, as with the case of compiler tokens, inertly translates text in the comments in the editor view. See example source word 134A and its translation 136A, which is not saved with the source code.

If the adornments are in the form of tokens provided by the compiler, the adornments need not be displayed in full when inserted. A configuration setting may control the maximum length or sub-portions of adornments that are to be displayed. Although the adornments are graphically displayed embedded in the lines of source code, the adornments are not saved with the source code when the source code is saved by the editor. In some embodiments, textual operations of the editor may recognize the new adornments. For instance, copying selected text may be possible, or a text search might find inserted tokens. In other embodiments, aside from being displayed, text inserted into the view is completely transparent to the text operations of the editor.

Figure 4:
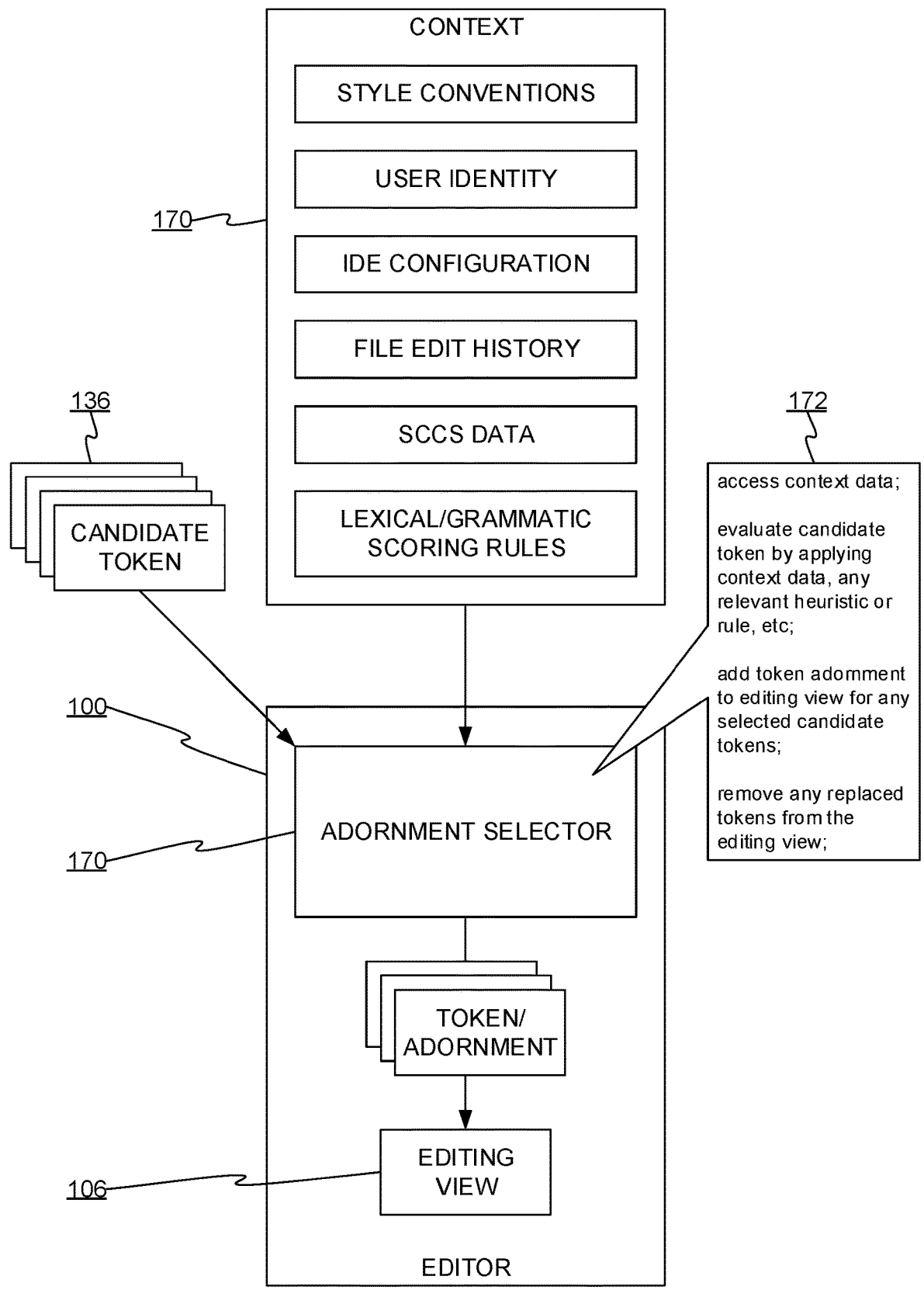
FIG. 4 shows how the editor may make use of context information to decide where, when, and how to insert code adornments.

FIG. 4 shows how the editor may make use of context information 150 to decide where, when, and how to insert code adornments. The editor may manage or have access to a set of context data 170. The context data 170 may be any information available to the editor or the IDE 110. The context data 170 may include information about preferred style or formatting conventions associated with the user or the source code. The formatting conventions may be similar to prettification rules. The identity of the user may be used to select preferences, configuration settings, etc. Configuration settings of the IDE or a project containing the source may be used. Metadata of the source code file may be used. For example, the last time the file was accessed, the last time the user read the file, the person who last edited the file, etc. Some file edit history or metadata may be obtained from a source code control system (SCCS), if in use. Such information may include what portions of code were edited by whom, and when, requirements associated with portions of code, etc. The context data 170 may also include various replacement rules, possibly lexical or syntactic. The rules may define conditions under which an insertion/replacement of an adornment is preferred. For example, a rule might specify that adornments for ambiguous or implicit references, declarations, or definitions are only to be applied if an explicit declaration is not within a certain number of lines, tokens, statements, etc. An adornment selector module 170 performs a process 172 to iterate over the candidate adornments or compiler tokens 136. The process 172 includes steps for accessing the context data 170, evaluating a candidate token or adornment by applying the context data to a heuristic or rules to decide which tokens or adornments to add, and adding any selected tokens or adornments to the relevant locations in the editing view 106. The algorithmic insertion of adornments allows for a user-specific view that aids the user with selective in-line information and also respects the underlying code.

The adornments may come from sources other than the compiler. For example, if the editor detects source code text that is not in the preferred human language of the user, the editor may obtain translations of tokens, keywords, comments, etc., and replace them in the manner described above for tokens. That is, the editing view shows the adornments in-line but without incorporation into the editable/savable text of the source code. The adornments may appear indistinguishable from the compiled/buffered source code, perhaps distinguished only by graphic traits such as font, color, or others.

Figure 5:
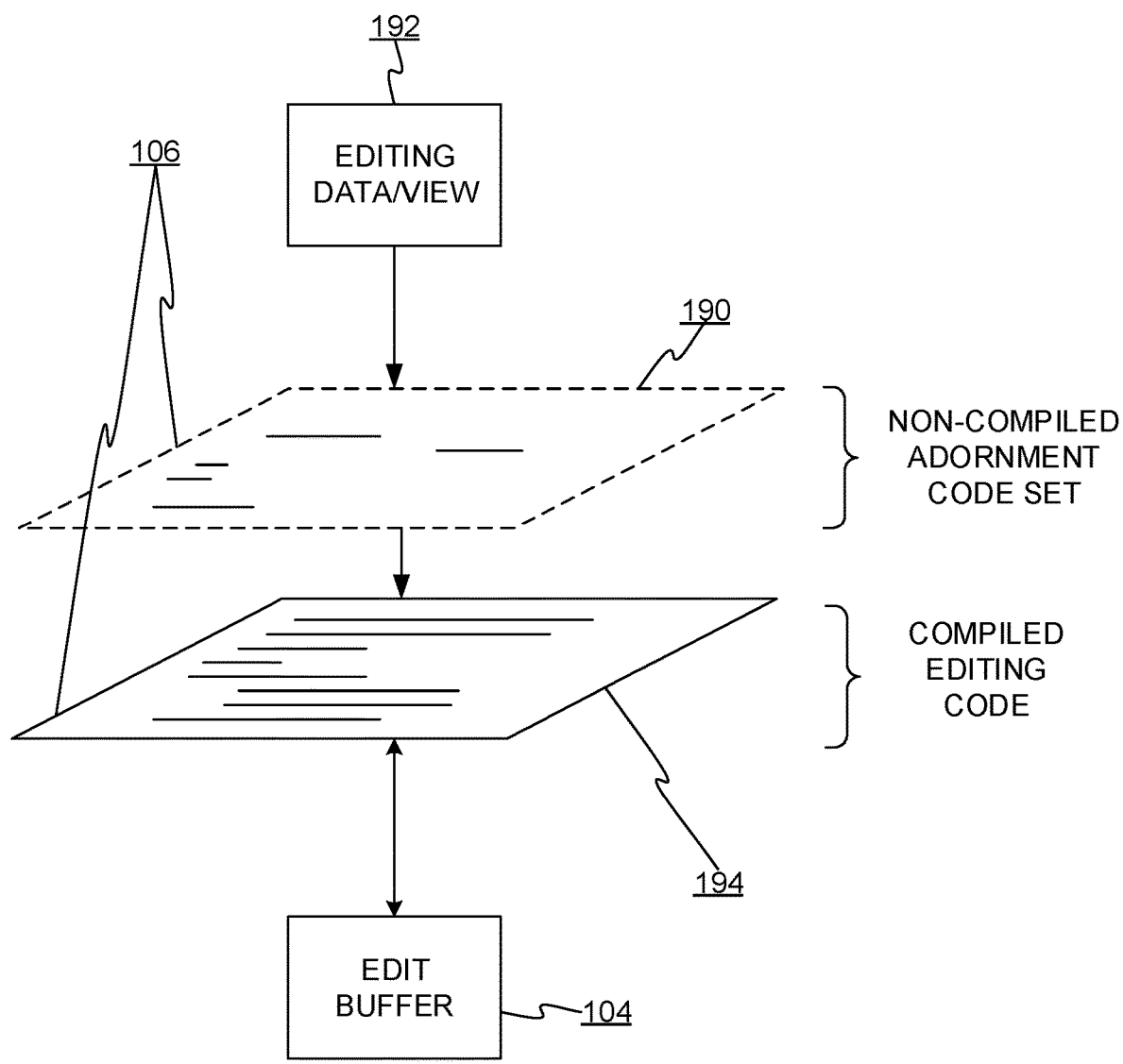
FIG. 5 shows how the editor logically separates adornment code and editable/compilable code.

FIG. 5 shows how the editor logically separates adornment code and code that is under the purview of the editor/IDE's editing and compiling functionality. The space-negotiating non-compiled adornment code 190 is tracked in editing view/data 192 maintained by the editor. The non-compiled adornment code 190 is merged with the ordinary compiled editing code 194 to display, in the editing view

106, a composite of the two sources of code. The editing view is a hybrid of source code that is managed in ordinary fashion by the editor and adornments that are not ultimately not compiled, either explicitly per a user command or as part of a continuous/background compile.

Although embodiments have been described as treating adornments as inert/unsaved text, other embodiments may allow annotations to support editing and/or saving. Such embodiments require some meaningful conversion before being persisted. For example, in the case of translating code comments, the translated language could be editable; however, when the information is persisted to the buffer, it may be translated down to the original language.

Figure 6:
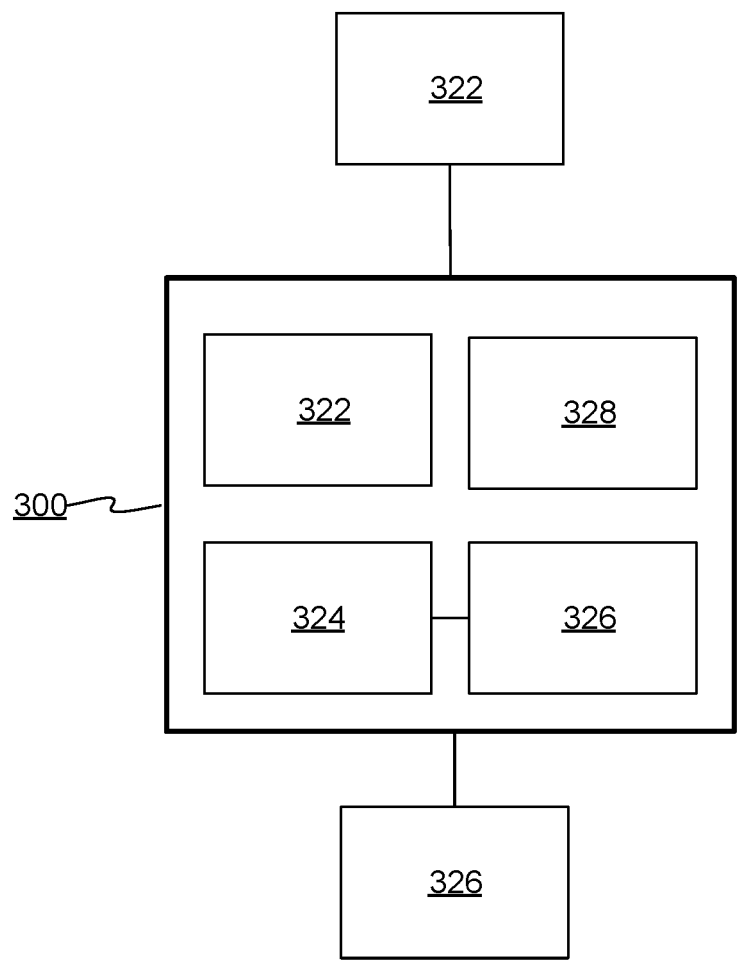
FIG. 6 shows details of a computing device.

FIG. 6 shows details of a computing device 300 on which embodiments described above may be implemented. The computing device 300 is an example of a client/personal device or backend physical (or virtual) server devices that may perform various (or perhaps most) of the processes described herein. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 300 (possibly via cloud APIs) to implement the embodiments described herein.

The computing device 300 may have one or more displays 322, a camera (not shown), a network interface 324 (or several), as well as storage hardware 326 and processing hardware 328, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 326 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device 300 may cooperate in ways well understood in the art of machine computing. In addition, input devices may be integrated with or in communication with the computing device 300. The computing device 300 may have any form-factor or may be used in any type of encompassing device. The computing device 300 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least hardware such as optical storage (e.g., compact-disk read-only memory (CD-ROM)), magnetic media, flash read-only memory (ROM), or any means of storing digital information in to be readily available for the processing hardware 328. The stored information can be in the form of machine executable instructions (e.g., compiled executable binary code), source code, bytecode, or any other information that can be used to enable or configure computing devices to perform the various embodiments discussed above. This is also considered to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by a computer comprising a display, processing hardware, and storage hardware storing instructions configured to cause the computer to perform the method, the method comprising:

executing a code editor comprising editing logic and an editing region displayed on the display, wherein the editing logic is interactively invokable via the editing region to enable text editing in the editing region;

opening, by the code editor, a source code file into a buffer and displaying the buffer with source code from the source code file in the editing region, wherein the source code in the buffer comprises tokens displayed in the editing region;

performing background compilation of the source code in the buffer while the source code in the buffer is displayed for editing in the editing region, wherein the background compilation obtains associations between the tokens in the source code in the buffer displayed in the editing region and tokens identified by and during the background compilation; and based on the associations, replacing, in the editing region, the tokens in the source code in the buffer displayed in the editing region with the tokens identified by and during the background compilation, wherein the replacement tokens are displayed inline in the source code displayed in the editing region.

2. A method according to claim 1, further comprising tracking the replacement tokens added to the source code file in the editing region, wherein when the source code in the buffer displayed in the editing region is saved to the source code file by the code editor, the replacement tokens displayed in the editing region are, according to the tracking, not saved to the source code file.

3. A method according to claim 2, wherein the editing region displays directly-mapped source code and the replacement tokens, wherein the directly-mapped source code comprises tokens not replaced by the replacing, wherein the code editor maintains a one-to-one mapping between the directly-mapped source code and the source code in the buffer, and wherein the code editor does not maintain a one-to-one mapping between the replacement tokens and the source code in the buffer.

4. A method according to claim 3, wherein the replacement tokens are not editable in the editing region and are not saved to the source code file when the buffer is saved to the source code file.

5. A method according to claim 1, wherein the code editor uses the buffer to store the source code that is displayed for editing in the editing region, wherein edits to the source code in the buffer that is displayed for editing in the editing region correspondingly update the buffer, and wherein the replacement tokens are not maintained in the buffer while they are displayed in the editing region.

6. A method according to claim 5, wherein a save of the buffer saves edits of tokens in the editing region that were not replaced and does not save the replacement tokens.

7. A method according to claim 6, wherein the editing region displays lines of the source code, wherein the replacement tokens are displayed within the lines of the source code, and wherein replacement of a token by a token identified by the background compilation comprises inserting the replacement token within a line of the source code, the line of the source code comprising characters prior to the inserting, the inserting comprising changing alignment of the characters within the line of the source code according to the number of characters displayed to represent the inserted replacement token.

8. A computer-readable storage device storing a code editor configured to be executed by a computing device, the code editor configured to perform a process, the process comprising:
   displaying editable lines of source code in a displayed editing region of the code editor;
   mapping compilable representation of the source code maintained in a buffer by the code editor to the editable lines of source code displayed in the editing region by the code editor;
   compiling the compilable representation of the source code maintained in the buffer while the editable lines of source code are displayed in the editing region by the code editor, wherein code adornments are obtained during the compiling of the compilable representation of the source code maintained in the buffer, wherein the code editor interfaces with a compiler that compiles the compilable representation of the source code maintained in the buffer to obtain the code adornments from the compiler, and wherein the compiling by the compiler is performed in the background responsive to edits of the editable lines of source code displayed in the editing region by the code editor; and
   inserting, within the displayed editable lines of source code displayed in the editing region by the code editor, the code adornments obtained during the compiling of the compilable representation of the source code maintained in the buffer.

9. A computer-readable storage device according to claim 8, wherein the compilable representation of the source code maintained in the buffer does not include representation of the inserted code adornments while the inserted code adornments are displayed in-line within the editable lines of source code displayed in the editing region by the code editor.

10. A computer-readable storage device according to claim 8, wherein the code adornments are inserted in locations of the editable lines of source code displayed in the editing region by the code editor that are determined by and during the compilation of the compilable representation of the source code maintained in the buffer.

11. A computer-readable storage device according to claim 8, wherein the code adornments comprise text tokens, respectively, obtained from compiling the compilable representation of the source code maintained in the buffer, wherein some of the text tokens are not inserted, and wherein the inserting comprises deciding which of the text tokens are to be inserted and which of the text tokens are not to be inserted.

12. A computer-readable storage device according to claim 11, wherein the deciding comprises applying a heuristic to one or more features of: the text tokens, a file from which the compilable representation of the source code maintained in the buffer was obtained, an identity of a user using the code editor, and/or a user-configurable setting.

13. A computer-readable storage device according to claim 8, wherein the code editor is configured to receive arbitrary programming modules to program the code editor, and wherein the process is performed by the code editor as programmed by a plug-in module received and executed by the code editor.

14. A computing device comprising storage hardware and processing hardware, the storage hardware storing information configured to cause the processing hardware to perform a process, the process comprising:
   executing a code editor comprising an editing buffer and an editing region displayed on a display, wherein the code editor is configured to enable interactive editing of the editing buffer displayed in the editing region, and wherein the editing buffer stores lines of source code displayed in the editing region;
   compiling the editing buffer while the lines of source code in the editing buffer are displayed and editable in the editing region, wherein the compiling comprises analyzing syntax and grammar of the source code to form a model of the source code, wherein the model of the source code comprises constructs of the source code not represented in the displayed lines of source code in the editing buffer displayed in the editing region, and wherein the compiling is performed in the background responsive to edits of the lines of source code in the editing buffer displayed in the editing region; and
   inserting the constructs of the source code from the model of the source code generated by the compiling within the displayed lines of source code in the editing region.

15. A computing device according to claim 14, wherein the constructs of the source code comprise a variable name, a method name, a class name, a property, or a data type.

16. A computing device according to claim 14, the process further comprising replacing a type-definition of a variable in a line of source code in the editing buffer displayed in the editing region with a semantically corresponding type-definition provided by the model of the source code.

17. A computing device according to claim 14, wherein the displayed lines of source code in the editing buffer displayed in the editing region comprise text characters in the editing region, and wherein the constructs of the source code comprise characters added to the editing region in line and between the text characters.

18. A computing device according to claim 14, the process further comprising selectively determining which constructs of the source code to incorporate into the displayed lines of source code in the editing buffer displayed in the editing region by applying heuristics, configuration settings, or rules to the constructs of the source code.

* * * * *